Figure 1:
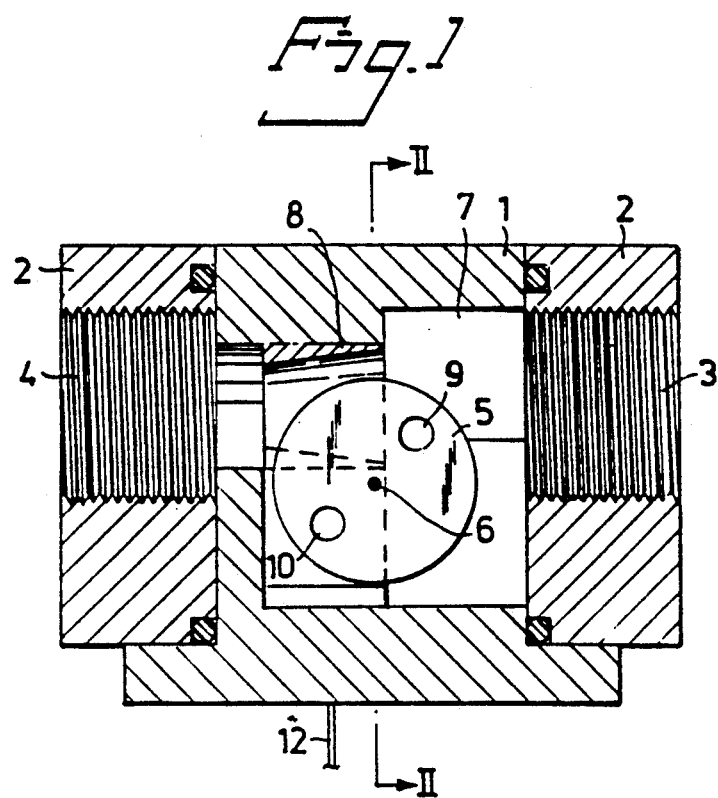

United States Patent
Norén

[11] Patent Number: 5,307,686
[45] Date of Patent: May 3, 1994

[54] DEVICE FOR MEASURING THE RATE OF FLOW OF A FLOWING FLUID

[76] Inventor: Anders Norén, Västra Valhallavägen 25B, Djursholm S-182 63, Sweden

[21] Appl. No.: 76,171

[22] Filed: Jun. 14, 1993

Related U.S. Application Data

[63] Continuation of Ser. No. 689,842, May 23, 1991, abandoned.

Foreign Application Priority Data

Dec. 1, 1988 [SE] Sweden .................................. 8804353

[51] Int. Cl.⁵ .................................................. G01L 1/00
[52] U.S. Cl. .................................. 73/861.87; 73/861.79
[58] Field of Search ............ 73/861.75, 861.79, 861.87, 73/54.02, 861.35, 861.92, 32 R, 861.38, 54.31, 54.33, 861.88

[56] References Cited

U.S. PATENT DOCUMENTS

| | | | |
|---|---|---|---|
| 1,911,267 | 5/1933 | Danks | 73/861.88 |
| 2,076,816 | 4/1937 | Hess | 73/59 |
| 2,267,317 | 12/1941 | Veenschoten | 73/59 |
| 2,354,299 | 7/1944 | Bays | 73/59 |
| 3,426,595 | 2/1969 | Skelton | 73/861.81 |
| 4,195,522 | 4/1980 | Anderson et al. | 73/861.79 |
| 4,377,091 | 3/1983 | DeCarlo et al. | 73/861.87 |

Primary Examiner—Richard E. Chilcot, Jr.
Assistant Examiner—R. Biegel
Attorney, Agent, or Firm—Larson and Taylor

[57] ABSTRACT

A device for measuring the rate of flow of a fluid flowing in a closed conduit includes a rotor whose speed of rotation is directly dependent on the flow rate of the fluid. The rotor is carried symmetrically on a shaft which extends substantially at right angles to the longitudinal axis of the conduit. The rotor includes measuring means in the form of bores provided therein, and a light-conductor is provided for determining the rotational speed of the rotor. The rotor preferably consists of a circular plate.

9 Claims, 2 Drawing Sheets

DEVICE FOR MEASURING THE RATE OF FLOW OF A FLOWING FLUID

This application is a continuation of application Ser. No. 07/813,703, filed Dec. 27, 1991, now abandoned.

The present invention relates to a device for measuring the rate of flow of a fluid in a closed line or conduit, said device comprising a rotor which is fully surrounded by the fluid and the speed of rotation of which is directly dependent on the rate of fluid flow. The rotor of a flowmeter of this kind is carried symmetrically by a shaft which extends substantially at right angles to the longitudinal axis of the conduit or line in which the fluid flows and the rotor axis is asymmetric in relation to the median line of the flow field in a cross-section through the rotor shaft, so that as the fluid flows the rotor is subjected to a resultant torque and begins to rotate, and said device further including measuring means which are operative to determine the rotational speed of the rotor.

Flowmeters provided with a rotor or like rotating element, for instance turbine wheels, paddle wheels or gear wheels powered by a flowing fluid are known to the art. One drawback with flowmeters of this known kind is the difficulty in manufacturing such meters, particularly flowmeters provided with small bladed rotors. Furthermore, the viscosity of the fluid exerts a large retarding force which when the fluid has a high viscosity will render the flowmeter inoperative.

An object of the present invention is to provide a novel flowmeter which is of considerably simpler construction then the flowmeters known hitherto and which is capable of functioning smoothly even when the fluid concerned has a very high viscosity.

Accordingly, the inventive flowmeter is characterized in that the surfaces of the rotor over which the fluid flows are configured so that the torque-generating forces are the result of the friction of the fluid against said surfaces.

According to one preferred embodiment of the invention, the inventive rotor comprises one or more, mutually parallel circular discs mounted on one and the same shaft, a circular cylinder or a polygonal body, for instance a four-sided plate, particularly a square plate. A perforated plate and also polygonal plates can obtain a given driving force as a result of the blade effect generated by the holes and the edges of the polygonal plates respectively.

The simplicity of manufacture of an inventive rotor, particularly a rotor in the form of a planar plate, renders the flowmeter highly competitive with regard to price, in all sizes, which applies particularly to conduits or like flow-lines of large dimensions for which conventional flowmeters are manufactured in small numbers of sizes and at high tool costs. Furthermore, one and the same rotor can be used within a large volumetric-flow area, by, for instance, modifying the diameter of the flow passage with the aid of different inserts.

Figure 2:
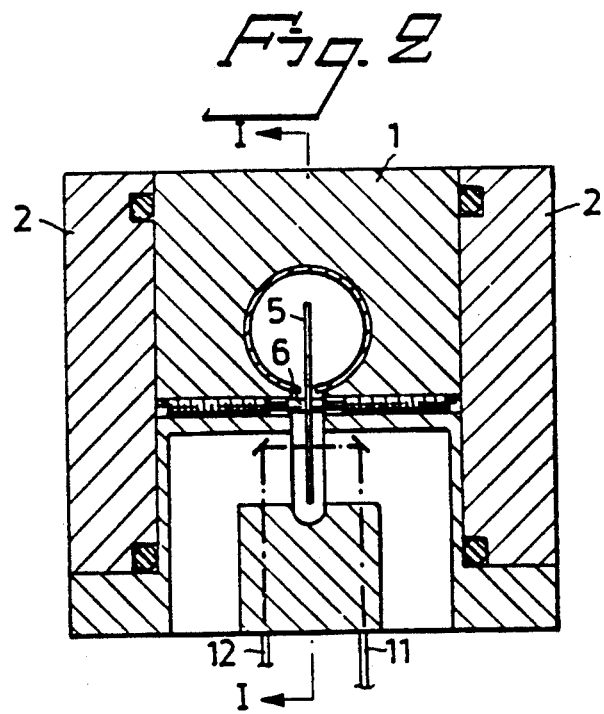
Figure 3:
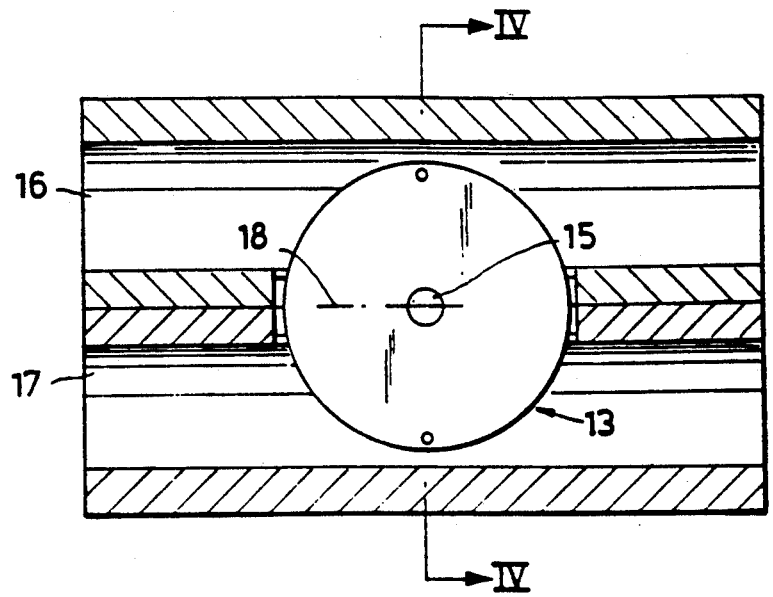
Figure 4:
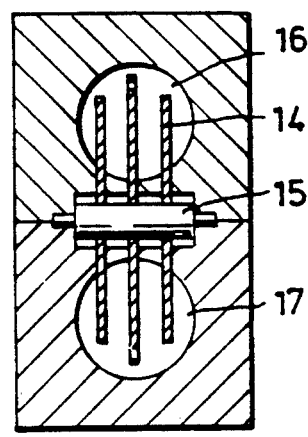
Figure 5:
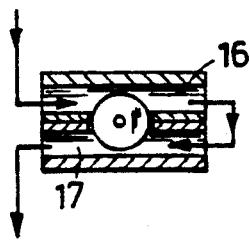
Figure 6:
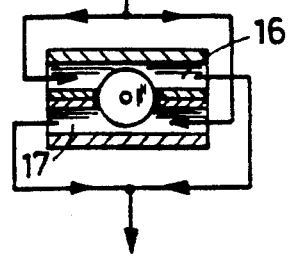

The invention will now be described in more detail with reference to the following drawings which illustrate preferred embodiments of an inventive flowmeter. FIG. 1 is a longitudinal sectional view of a first embodiment, taken on the line I—I in FIG. 2. FIG. 2 is a cross-sectional view taken on the line II—II in FIG. 1. FIG. 3 is a longitudinal sectioned view of a second embodiment of the inventive device, and FIG. 4 is a cross-sectional view taken on the line IV—IV in FIG. 3. FIGS. 5 and 6 illustrate, in smaller scale, the flowmeter according to FIGS. 3 and 4 connected-up in a conduit or like flow-line.

In the case of the embodiment illustrated in FIGS. 1 and 2, the body 1 of the flowmeter is incorporated in a conduit 2 having an inlet 3 and an outlet 4. As shown in the drawings, conduit 2 defines a fluid flow passage which is substantially open and unobstructed. The rotor of the flowmeter consists of a circular plate 5 which is journalled symmetrically on a shaft 6, which extends perpendicularly to the longitudinal axis of the conduit 2. The surfaces of rotor plate 5 over which the fluid flows are preferably smooth. The plate 5 is positioned in a space 7 in the body 1 which is asymmetric in relation to the median line of the flow field in a cross section through the rotor shaft and is also asymmetric to the longitudinal axis of the conduit 2. Located at the outlet of the space 7 leading to the outlet 4 of the conduit is a flow-throttling nozzle 8. The plate 5 has two holes or bores 9 and 10 which extend parallel with the shaft 6 of said plate. These bores receive light from a light-conductor, e.g. the light-conductor 11, and conduct the light to a further light-conductor, e.g. the light-conductor 12. The bores extend parallel to the rotor axis and are operative to conduct light from a light source on one side of the rotor to a light-sensor on the other side of the rotor. It is thus possible to measure the speed of rotation of the plate 5 on the basis of the time which passes between those time points at which the light-conductor 12 receives the light from the light-conductor 11.

Alternatively, the speed at which the rotor or plate rotates can be measured with the aid of a light-emitter/-light-receiver which operates with reflection on the rotor. Inductive and magnetic sensors can also be used for the purpose of measuring rotor speed.

The embodiment of the flowmeter illustrated in FIGS. 3, 4, 5 and 6 has a rotor 13 which comprises three mutually parallel and circular plates 14 journalled on one and the same rotor shaft 15. The rotor 13 is coupled so as to lie in two mutually parallel conduits 16,17 which constitute a mirror image of one another about an imaginary longitudinal axis passing through the centre of the rotor 13. When fluid flows in mutually opposite directions through the conduits 16,17, as illustrated in FIGS. 5 and 6, the journals of the rotor 13 are relieved completely of fluid forces exerted by the rotor. In the FIG. 5 illustration, the conduits 16,17 are connected in series, whereas in the FIG. 6 illustration they are connected in parallel. As shown in the drawings, each rotor is positioned such that the periphery of the rotor lies within the fluid flow passage.

I claim:

1. A device for measuring the rate of flow of a fluid flowing in a closed and substantially unobstructed flow passage, said device comprising: a single rotor having the form of a circular planar plate, said plate being fully surrounded by the fluid, the speed of rotation of the rotor being directly dependent on the flow rate of the fluid in said flow passage, said rotor being carried symmetrically by a shaft which extends substantially at right angles to the longitudinal axis of the flow passage, said rotor shaft being located asymmetrically in relation to the median line of the flow passage in a cross-section through the flow passage and through the rotor shaft so that as the fluid flows the rotor will obtain a resultant torque and begin to rotate, the rotor surfaces over which the fluid flows being configured so that torque-generating forces occur substantially only as a result of the friction of the fluid against said surfaces; and means for determining the rotational speed of the rotor.

2. A device according to claim 1, wherein the rotational speed determining means comprises at least one bore provided in the rotor and extending parallel with said axis, said bore being operative to conduct light from a light source on one side of the rotor to a light-receiver on the other side of said rotor.

3. A device according to claim 1, wherein the rotor surfaces over which the fluid flows are smooth.

4. A device according to claim 1, wherein the rotor lies in two mutually parallel conduits which are the mirror image of one another around a longitudinal axis passing through the center of the rotor.

5. A device according to claim 1, wherein the rotational speed measuring means comprises light receiver means.

6. A device according to claim 1, wherein the rotational speed measuring means comprises an inductive sensor.

7. A device according to claim 1, wherein the rotational speed measuring means comprises a magnetic sensor.

8. A device according to claim 1, wherein said flow passage comprises a first portion disposed on one side of said rotor through which, in use of the device, fluid may flow in a first direction, and second portion disposed on the opposite side of said rotor through which, in use of the device, fluid may flow in a second direction opposite to said first direction.

9. A device according to claim 1, wherein rotor is positioned such that the periphery of the rotor lies within the fluid flow passage.

* * * * *